United States Patent
Bedingfield, Sr. et al.

(10) Patent No.: US 8,024,438 B2
(45) Date of Patent: Sep. 20, 2011

(54) METHODS, SYSTEMS, AND COMPUTER PROGRAM PRODUCTS FOR IMPLEMENTING BANDWIDTH MANAGEMENT SERVICES

(75) Inventors: James Carlton Bedingfield, Sr., Lilburn, GA (US); Jeffrey A. Aaron, Atlanta, GA (US)

(73) Assignee: AT&T Intellectual Property, I, L.P., Atlanta, GA (US)

( * ) Notice: Subject to any disclaimer, the term of this patent is extended or adjusted under 35 U.S.C. 154(b) by 913 days.

(21) Appl. No.: 11/304,422

(22) Filed: Dec. 14, 2005

(65) Prior Publication Data
US 2006/0251116 A1    Nov. 9, 2006

Related U.S. Application Data

(60) Provisional application No. 60/667,018, filed on Mar. 31, 2005.

(51) Int. Cl.
  *G06F 15/16* (2006.01)
(52) U.S. Cl. .......................................... 709/223; 709/224
(58) Field of Classification Search ................... 709/227, 709/223, 228
See application file for complete search history.

(56) References Cited

U.S. PATENT DOCUMENTS

| | | |
|---|---|---|
| 4,017,676 A | 4/1977 | Rabeler et al. |
| 4,380,687 A | 4/1983 | Stewart |
| 4,439,784 A | 3/1984 | Furukawa et al. |
| 4,769,697 A | 9/1988 | Gilley et al. |
| 4,802,022 A | 1/1989 | Harada |
| 4,903,130 A | 2/1990 | Kitagawa et al. |
| 4,907,079 A | 3/1990 | Turner et al. |
| 5,255,180 A | 10/1993 | Shinoda et al. |
| 5,278,654 A | 1/1994 | Yang |
| 5,313,282 A | 5/1994 | Hayashi |
| 5,331,354 A | 7/1994 | Koyama et al. |
| 5,731,764 A | 3/1998 | Tanaka |
| 5,793,409 A | 8/1998 | Tetsumura |
| 5,844,600 A | 12/1998 | Kerr |
| 5,874,986 A | 2/1999 | Gibbon et al. |
| 5,892,856 A | 4/1999 | Cooper et al. |
| 5,892,859 A * | 4/1999 | Grote ................................. 385/2 |
| 5,995,153 A | 11/1999 | Moeller et al. |
| 6,014,694 A | 1/2000 | Aharoni et al. |

(Continued)

FOREIGN PATENT DOCUMENTS
WO    W02003058478    7/2003

OTHER PUBLICATIONS

D'Hont, Susy, "The Cutting Edge of RFID Technology and Applications for Manufacturing and Distribution," Texas Instruments, TIRIS, pp. 1-13.

(Continued)

*Primary Examiner* — Wing Chan
*Assistant Examiner* — Andrew Woo
(74) *Attorney, Agent, or Firm* — Cantor Colburn LLP

(57) ABSTRACT

Methods, systems, and computer program products for implementing bandwidth management services are provided. The method includes associating a service session of a connection with at least one of a device and a user of the device for an account. The method also includes evaluating the service session for an event. The evaluation factors in capabilities associated with the device and/or service session. The method further includes notifying the account upon an occurrence of the event.

27 Claims, 4 Drawing Sheets

U.S. PATENT DOCUMENTS

| | | | |
|---|---|---|---|
| 6,025,869 | A | 2/2000 | Stas et al. |
| 6,052,734 | A | 4/2000 | Ito et al. |
| 6,057,872 | A | 5/2000 | Candelore |
| 6,078,589 | A | 6/2000 | Kuechler |
| 6,147,992 | A * | 11/2000 | Giroir et al. ............. 370/390 |
| 6,177,931 | B1 | 1/2001 | Alexander et al. |
| 6,216,956 | B1 | 4/2001 | Ehlers et al. |
| 6,237,022 | B1 | 5/2001 | Bruck |
| 6,240,460 | B1 | 5/2001 | Mitsutake et al. |
| 6,260,111 | B1 | 7/2001 | Craig et al. |
| 6,315,668 | B1 * | 11/2001 | Metke et al. ............. 463/42 |
| 6,324,182 | B1 | 11/2001 | Burns |
| 6,400,687 | B1 * | 6/2002 | Davison et al. ............. 370/236 |
| 6,480,753 | B1 | 11/2002 | Calder et al. |
| 6,591,423 | B1 | 7/2003 | Campbell |
| 6,594,826 | B1 | 7/2003 | Rao et al. |
| 6,609,253 | B1 | 8/2003 | Swix et al. |
| 6,631,118 | B1 | 10/2003 | Jones |
| 6,647,411 | B2 | 11/2003 | Towell |
| 6,717,507 | B1 | 4/2004 | Bayley et al. |
| 6,741,563 | B2 | 5/2004 | Packer |
| 6,757,796 | B1 | 6/2004 | Hofmann |
| 6,771,661 | B1 * | 8/2004 | Chawla et al. ............. 370/468 |
| 6,796,787 | B2 | 9/2004 | Okada |
| 6,810,528 | B1 | 10/2004 | Chatani |
| 6,816,903 | B1 * | 11/2004 | Rakoshitz et al. ............. 709/226 |
| 6,839,052 | B1 | 1/2005 | Kramer |
| 6,870,463 | B2 | 3/2005 | Dresti et al. |
| 6,889,382 | B1 | 5/2005 | Anderson |
| 6,961,341 | B1 | 11/2005 | Krishnan |
| 6,973,066 | B2 | 12/2005 | Gutowski |
| 7,000,246 | B1 | 2/2006 | Takao |
| 7,065,586 | B2 | 6/2006 | Ruttenberg et al. |
| 7,151,939 | B2 | 12/2006 | Sheynblat |
| 7,277,894 | B2 | 10/2007 | Kondo et al. |
| 7,284,201 | B2 | 10/2007 | Cohen-Solal |
| 7,437,073 | B2 | 10/2008 | Kim et al. |
| 7,512,650 | B2 | 3/2009 | Richardson |
| 7,519,703 | B1 | 4/2009 | Stuart et al. |
| 2001/0031633 | A1 | 10/2001 | Tuomela et al. |
| 2001/0043571 | A1 * | 11/2001 | Jang et al. ............. 370/260 |
| 2002/0002708 | A1 | 1/2002 | Arye |
| 2002/0018645 | A1 | 2/2002 | Nakamatsu et al. |
| 2002/0046099 | A1 | 4/2002 | Frengut et al. |
| 2002/0080721 | A1 | 6/2002 | Tobagi et al. |
| 2002/0083443 | A1 | 6/2002 | Eldering et al. |
| 2002/0104087 | A1 | 8/2002 | Schaffer et al. |
| 2002/0108127 | A1 | 8/2002 | Lew |
| 2002/0133830 | A1 | 9/2002 | Kim |
| 2002/0144259 | A1 | 10/2002 | Gutta et al. |
| 2002/0164987 | A1 | 11/2002 | Caronni et al. |
| 2002/0178440 | A1 | 11/2002 | Agnihotri et al. |
| 2002/0194586 | A1 | 12/2002 | Gutta et al. |
| 2003/0002642 | A1 * | 1/2003 | Jorasch et al. ............. 379/201.01 |
| 2003/0002862 | A1 | 1/2003 | Rodriguez et al. |
| 2003/0004743 | A1 | 1/2003 | Callegari |
| 2003/0028872 | A1 | 2/2003 | Milovanovic et al. |
| 2003/0046704 | A1 | 3/2003 | Laksono et al. |
| 2003/0061619 | A1 | 3/2003 | Giammaressi |
| 2003/0067554 | A1 | 4/2003 | Klarfeld |
| 2003/0088878 | A1 | 5/2003 | Rogers |
| 2003/0118029 | A1 | 6/2003 | Maher, III et al. |
| 2003/0135544 | A1 | 7/2003 | Richardson |
| 2003/0154242 | A1 | 8/2003 | Hayes et al. |
| 2003/0154246 | A1 | 8/2003 | Ollikainen |
| 2003/0236745 | A1 * | 12/2003 | Hartsell et al. ............. 705/40 |
| 2004/0009761 | A1 | 1/2004 | Money et al. |
| 2004/0013119 | A1 | 1/2004 | MeLampy et al. |
| 2004/0071085 | A1 | 4/2004 | Shaham et al. |
| 2004/0078814 | A1 | 4/2004 | Allen |
| 2004/0125757 | A1 | 7/2004 | Mela et al. |
| 2004/0183749 | A1 | 9/2004 | Vertegaal |
| 2004/0221304 | A1 | 11/2004 | Sparrell et al. |
| 2004/0226034 | A1 | 11/2004 | Kaczowka et al. |
| 2004/0255336 | A1 | 12/2004 | Logan |
| 2004/0264563 | A1 | 12/2004 | Inoue et al. |
| 2004/0266407 | A1 | 12/2004 | Lee et al. |
| 2004/0268407 | A1 | 12/2004 | Sparrell et al. |
| 2004/0268410 | A1 | 12/2004 | Barton |
| 2005/0002662 | A1 | 1/2005 | Arpa et al. |
| 2005/0007965 | A1 | 1/2005 | Hagen et al. |
| 2005/0022239 | A1 | 1/2005 | Meuleman |
| 2005/0024543 | A1 | 2/2005 | Ramaswamy et al. |
| 2005/0039219 | A1 | 2/2005 | Cooper et al. |
| 2005/0066026 | A1 | 3/2005 | Chen et al. |
| 2005/0081252 | A1 | 4/2005 | Chefalas |
| 2005/0097595 | A1 | 5/2005 | Lipsanen et al. |
| 2005/0108328 | A1 | 5/2005 | Berkeland et al. |
| 2005/0120113 | A1 * | 6/2005 | Bunch et al. ............. 709/224 |
| 2005/0144640 | A1 | 6/2005 | Fritsch et al. |
| 2005/0183110 | A1 | 8/2005 | Anderson |
| 2005/0266825 | A1 | 12/2005 | Clayton |
| 2006/0013266 | A1 | 1/2006 | Vega-Garcia et al. |
| 2006/0025151 | A1 | 2/2006 | Karaoguz et al. |
| 2006/0028185 | A1 | 2/2006 | Hernandez et al. |
| 2006/0056389 | A1 | 3/2006 | Monk et al. |
| 2006/0095398 | A1 | 5/2006 | Bhaskaran |
| 2006/0114360 | A1 | 6/2006 | Kortum et al. |
| 2006/0125959 | A1 | 6/2006 | Yoshizawa et al. |
| 2006/0174266 | A1 | 8/2006 | Gatto et al. |
| 2006/0179466 | A1 | 8/2006 | Pearson et al. |
| 2006/0184780 | A1 | 8/2006 | Yamada et al. |
| 2006/0195866 | A1 | 8/2006 | Thukral |
| 2006/0204214 | A1 | 9/2006 | Shah et al. |
| 2006/0221826 | A1 | 10/2006 | Bedingfield, Sr. et al. |
| 2006/0222015 | A1 | 10/2006 | Kafka et al. |
| 2006/0222110 | A1 | 10/2006 | Kuhtz |
| 2006/0225106 | A1 | 10/2006 | Bedingfield, Sr. |
| 2006/0251116 | A1 | 11/2006 | Bedingfield et al. |
| 2007/0133603 | A1 | 6/2007 | Weaver et al. |
| 2007/0136772 | A1 | 6/2007 | Weaver et al. |
| 2007/0169142 | A1 | 7/2007 | Claassen et al. |

OTHER PUBLICATIONS

"RFID News," Texas Instruments, Issue No. 20, 2000, Copyright—Nov. 2000, pp. 1-12.

U.S. Appl. No. 11/300,125, filed Dec. 14, 2005.

U.S. Appl. No. 11/300,061, filed Dec. 14, 2005.

U.S. Appl. No. 11/300,212, filed Dec. 14, 2005.

* cited by examiner ized over a
METHODS, SYSTEMS, AND COMPUTER PROGRAM PRODUCTS FOR IMPLEMENTING BANDWIDTH MANAGEMENT SERVICES

CROSS REFERENCE TO RELATED APPLICATIONS

This application claims priority to U.S. Provisional Application No. 60/667,018, filed on Mar. 31, 2005. This application is related to commonly assigned U.S. patent application Ser. No. 11/304,264, entitled METHODS, SYSTEMS, AND COMPUTER PROGRAM PRODUCTS FOR PROVIDING TRAFFIC CONTROL SERVICES, filed on Dec. 14, 2005. These applications are incorporated by reference herein in their entireties.

BACKGROUND

The present invention relates generally to communications services, and more particularly, to methods, systems, and computer program products for implementing bandwidth management services.

Digital Subscriber Line (DSL) technology is a copper loop transmission technology that provides increased bandwidth in the last mile between communication service providers and the users of these services. DSL technology provides broadband speed over a conventional phone wire, which in turn, allows service providers to provide multimedia applications, e.g., video, VoIP, Internet, etc., to their customers over their existing outside plant infrastructure.

Various services (e.g., television services), however, typically consume large amounts of bandwidth on a DSL connection. When multiple services (e.g., television, video/music downloading, gaming, etc.) are simultaneously utilized over a single connection (e.g., household), the overall quality of these services can be negatively impacted due to strain on the available bandwidth (e.g., transmission delays or dropped packets), resulting in loss of quality, such as reduced VoIP voice quality or pixelization of video images. Customers may have some rudimentary knowledge of these issues and attempt to troubleshoot by activating and deactivating various services. However, they cannot be sure of the precise cause, timing, and effects of exercising these options unless they are given specific information about the actual cause and effects of the underlying issues.

What is needed, therefore, is a way to identify bandwidth issues that affect the quality of a service or services and to provide sufficient and timely information to those affected by the issues, in a way that is easily understood, thereby providing an opportunity to respond and potentially optimize these services in accordance with their current needs or desires.

BRIEF SUMMARY

Exemplary embodiments of the invention include a method for implementing bandwidth management services. The method includes associating a service session of a connection with at least one of a device and a user of the device for an account. The method also includes evaluating the service session for an event. The evaluation factors in capabilities associated with the device and/or service session. The method further includes notifying the account upon an occurrence of the event.

Additional embodiments include a system for implementing bandwidth management services. The system includes a processor executing a bandwidth management application that receives data from at least one monitoring device monitoring the service session. The bandwidth management application performs a method. The method includes associating a service session of a connection with at least one of a device and a user of the device for an account. The method also includes evaluating the service session for an event. The evaluation factors in capabilities associated with the device and/or service session. The method further includes notifying the account upon an occurrence of the event.

Further embodiments include a computer program product for implementing bandwidth management services. The computer program product includes instructions for implementing a method. The method includes associating a service session of a connection with at least one of a device and a user of the device for an account. The method also includes monitoring and evaluating the service session for an event. The evaluation factors in capabilities associated with the device and/or service session. The method further includes notifying the account upon an occurrence of the event.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES.

The detailed description explains exemplary embodiments, together with advantages and features, by way of example with reference to the drawings.

DETAILED DESCRIPTION OF EXEMPLARY EMBODIMENTS

In accordance with exemplary embodiments, bandwidth management services are provided, which include monitoring traffic and traffic types transiting a network connection, analyzing the traffic measurements, determining approximately when, and in what manner, simultaneously provided services (e.g., services provided over multiple simultaneous service sessions) are likely to interfere with or otherwise impact each other, and to appropriately notify those affected of these conditions (also referred to herein as "at risk user experience events" and "events") either continuously and/or at the time, providing sufficient information and in an appropriately understandable manner so that those affected may take corrective actions.

Figure 1:
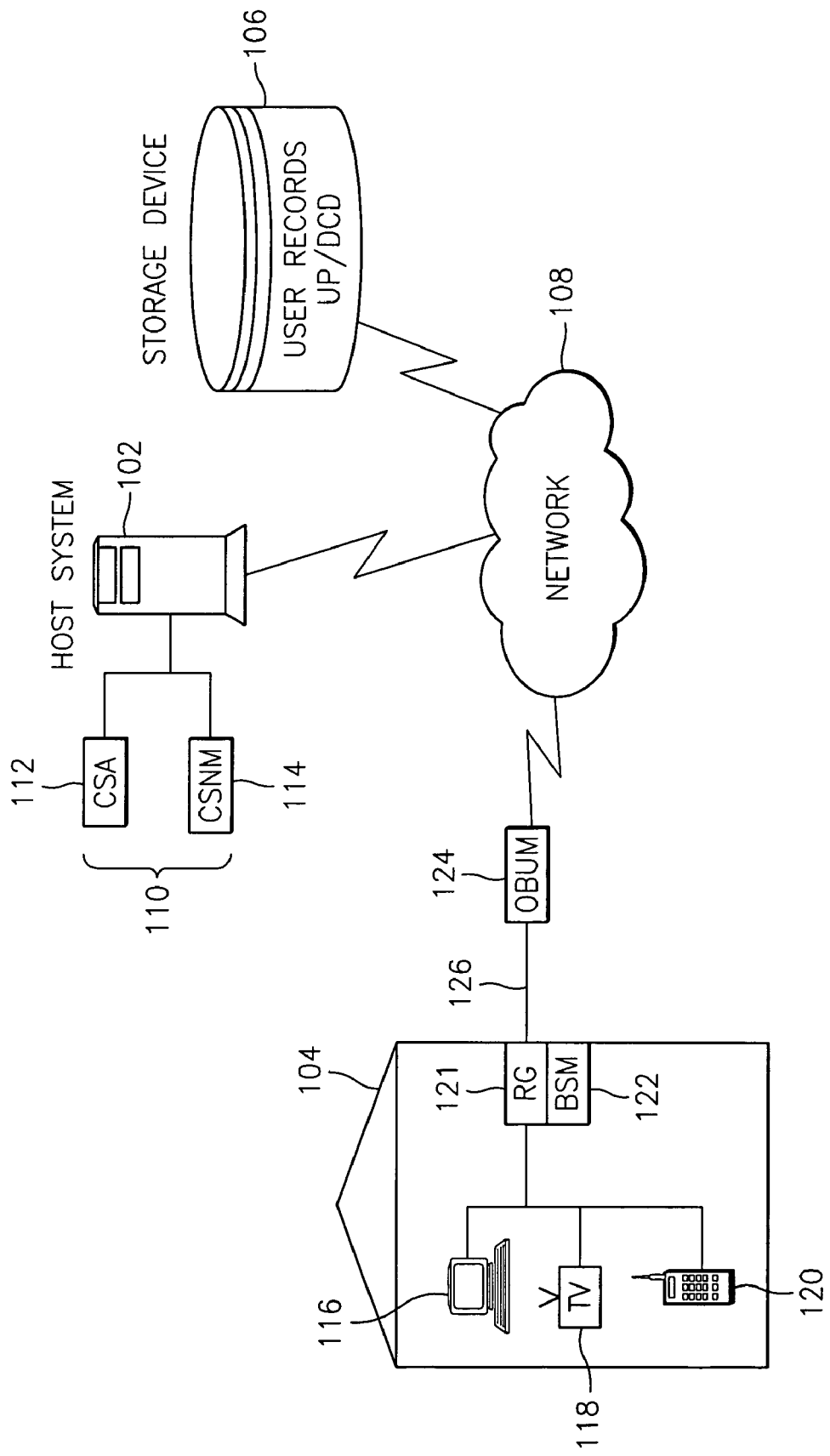
FIG. 1 is a system upon which the bandwidth management services may be implemented in exemplary embodiments.

Turning now to FIG. 1, a network system upon which the bandwidth management services may be implemented will now be described. In exemplary embodiments, the system of FIG. 1 includes a host system 102 in communication with customer premises 104 and a storage device 106 over one or more networks (e.g., network 108). The host system 102 may be implemented by a server operated by a service provider (e.g., provider of DSL services). The service provider provides DSL services (also referred to as service sessions) to customer premises (e.g., 104) via a pathway 126, which services are further distributed to the appropriate devices therein. While the system of FIG. 1 illustrates a single pathway 126 interconnecting the service provider of host system 102 to the customer premises 104, it will be appreciated that there may be many pathways leading to a single customer premises or to many separate customer premises and that the pathway 126 may include portions where services to multiple customers hare the same pathway through a multiplexing scheme.

The server may be implemented using one or more processors operating in response to a computer program stored in a storage medium accessible by the server. The server may operate as a network server (e.g., a web server) to communicate with communications elements such as devices 116-120 and gateway 121. The server handles sending and receiving information to and from one or more communications elements and can perform associated tasks.

The server of host system 102 may also operate as an application server. The server executes one or more computer programs to implement the bandwidth management processes and related functions described herein. These one or more applications are referred to herein as a bandwidth management application 110. It will be understood that separate servers may be utilized to implement the network server functions and the application server functions.

The bandwidth management application 110 comprises a connection status analyzer (CSA) 112 and a connection status notification module (CSNM) 114. CSA 112 receives information (e.g., customer notification preferences, device capabilities, and bandwidth information such as measurements) from network elements, processes that information including determining whether one or more events have occurred, and forwards the results of the processing to the CSNM 114 as will be described further herein. CSA 112 may include a user interface for enabling the customer notification preferences and, optionally, device capabilities functions. CSNM 114 communicates with CSA 112, storage device 106, and one or more of communications devices 116-120 via gateway 121. CSNM 114 processes information received from CSA 112 in light of information retrieved from storage device 106 and provides status notifications (also referred to herein as "alerts") to the customer premises 104.

Figure 4:
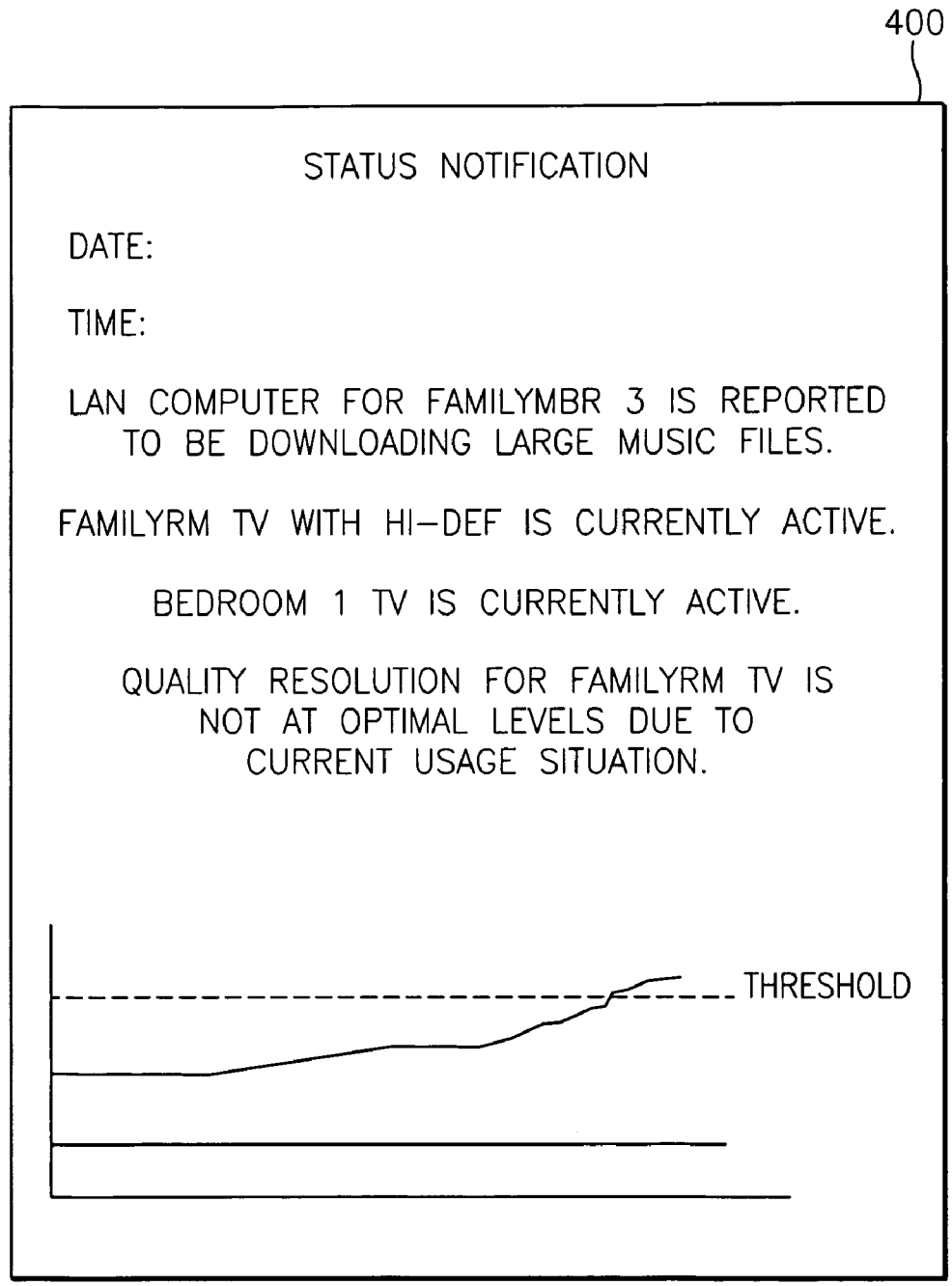
FIG. 4 is a status notification with sample data generated via the bandwidth management services in exemplary embodiments.

The notification or alert may take one of various forms, and may include any type of useful communication or signal. For example, the notification may be a visual display of the nature and cause of a service issue or event. The notification may alternatively or additionally involve sending an electronic message (e.g., email message, short message service message), which may be sent through network 108 to the customer premises 104 and distributed to, e.g., one or more devices 116-120. A sample alert is shown in FIG. 4.

As shown in the system of FIG. 1, host system 102 is indirectly connected to a storage device 106 via network 108. However, it will be understood by those skilled in the art that host system 102 may be in direct communication with storage device 106 via, e.g., wireline or wireless technologies, etc. Alternatively, storage device 106 may be implemented using memory contained in the host system 102. Storage device 106 may be implemented using a variety of devices for storing electronic information. The storage device 106 may be logically addressable as a consolidated data source across a distributed environment that includes, e.g., network 108. Information stored in the storage device 106 may be retrieved and manipulated via the host system 102. The storage device 106 includes a data repository containing, e.g., documents, data, web pages, images, multimedia, etc. In exemplary embodiments, storage device 106 stores a user preferences database for customer accounts, a device capability database relating to characteristics, requirements, and capabilities of communications devices 116-120, and other related data. These databases are described further herein. In an exemplary embodiment, the server of host system 102 operates as a database server and coordinates access to application data including data stored within the storage device 106.

Network 108 may be any type of known network including, but not limited to, a Local Area Network (LAN), a Wide Area Network (WAN), a global network (e.g., Internet), or other network configuration known in the art. These networks may be implemented using a wireless network or may be physically connected to each other in a state of the art configuration. Further, the network 108 may include wireless connections, radio based communications, telephony based communications, optical communications, and other network-based communications.

Customer premises 104 may comprise, e.g., a residential entity or business establishment. Customer premises 104 include various devices that utilize DSL services provided by a service provider (e.g., host system 102) via one or more pathways (e.g., 126). These devices, in turn, may communicate with one another via, e.g., a local area network (LAN) implemented within customer premises 104. The network of customer premises 104 may be wireline, wireless, or a combination thereof. Devices residing in customer premise 104 may include, e.g., one or more computer systems (e.g., device 116), one or more televisions (e.g., device 118), one or more telephony devices (e.g., device 120), to name a few.

Computer system 116 may comprise a personal computer, gaming system, tablet computer, handheld PDA/computing device, laptop, or other similar type of processing device. Computer system 116 may implement a variety of network-enabled applications, such as Internet gaming, interactive applications, video chat, graphical/pictorial applications, multi-media applications, etc. These applications, in turn, utilize bandwidth associated with video content, audio content, generic data, encrypted data, graphical content, pictorial content, interactive media, and multi-media content. Television device 118 may include a standard broadcast, cable, and/or premium channel-viewing device. Television device 118 may also comprise network elements that support, e.g., Web TV. In addition, television device 118 may include peripheral components, such as a set top box, remote control, personal video recorder (PVR), or other suitable elements. Note that any of these peripheral components may provide computing functions and operations. Telephony device 120 may comprise a wireline telephone, a cellular telephone, or other suitable voice communications device. Further, telephony device 120 may implement multi-media applications such as video/text messaging and related functions.

Customer premise 104 also includes a gateway, e.g., residential gateway (RG) 121 that may serve as a DSL modem and, optionally, a routing device to allow one or more of devices 116-120 to communicate via a DSL interface. The residential gateway 121 may also be used to provide a firewall to inhibit viruses from affecting the devices in the customer premises 104. In exemplary embodiments, the residential gateway 121 comprises a bandwidth session monitor (BSM) 122.

The residential gateway 121 of customer premises 104 communicates with network 108 via, e.g., a digital subscriber line access multiplexor (DSLAM) (not shown). The DSLAM concentrates traffic from multiple DSL loops onto a backbone network, which is part of the network 108. The DSLAM may, in some embodiments, operate on packets, frames, and/or messages passing therethrough. For example, to support dynamic IP address assignment, the DSLAM may inspect the IP address of packets to direct the packets to their proper destination.

The customer premise 104 and its related devices may be identified and managed by the host system 102 through an account. For example, an account record may be generated and maintained for each customer premise serviced by the host system 102. Alternatively, any combination of devices or users (e.g., from multiple premises, locations, or groups) may be associated with an account as desired. It will be understood that the accounts may be established based upon other identifying criteria and that the association between customer premise 104 and the account is provided for purposes of illustration and is not intended to be limiting in scope.

Also residing in the network 108 is an overall bandwidth usage monitor (OBUM) 124, which is in the path of the network connection that supports the customer premises 104, in order to be able to perform bandwidth usage measurements and other traffic measurements relevant to the customer/device user/account holder. For example, the OBUM 124 may be running in a router or access concentrator of the network 108.

The monitors 122 and 124 form a comprehensive monitoring system. For illustrative purposes, two monitoring devices 122 and 124 are shown in the system of FIG. 1. However, it will be appreciated that there may be more or fewer monitoring devices, depending on the need. In exemplary embodiments, each of the monitoring devices 122 and 124 receives the service destined for the specific customer premises 104 and each allows the service to continue e.g., over the network 108 and/or along the pathway 126 to the customer premises 104 so that service is not interrupted. However, each of these individual monitoring devices 122, 124 measure one or more characteristics of the service via the communications signal transmitted therethrough, such as voltage and/or power level and/or data rate and/or data delay/latency and/or data loss, and compares the measurement to a threshold or other criteria that defines what is to be expected or what is known to be acceptable to the customer of customer premises 104. The monitors 122 and 124 may be implemented via, e.g., hardware and/or software elements. Furthermore, the monitors 122 and 124 may be incorporated into other systems, such as one or more of devices 116-120. Alternatively, BSM 122 may reside in the network 108 rather than in customer premise 104.

In alternative exemplary embodiments, the CSA 112, CSNM 114 and OBUM 124 may be implemented locally, e.g., via residential gateway 121, rather than by the host system 102 and network elements. In this embodiment, network 108 may be implemented as a LAN with respect to customer premise 104.

Figure 2:
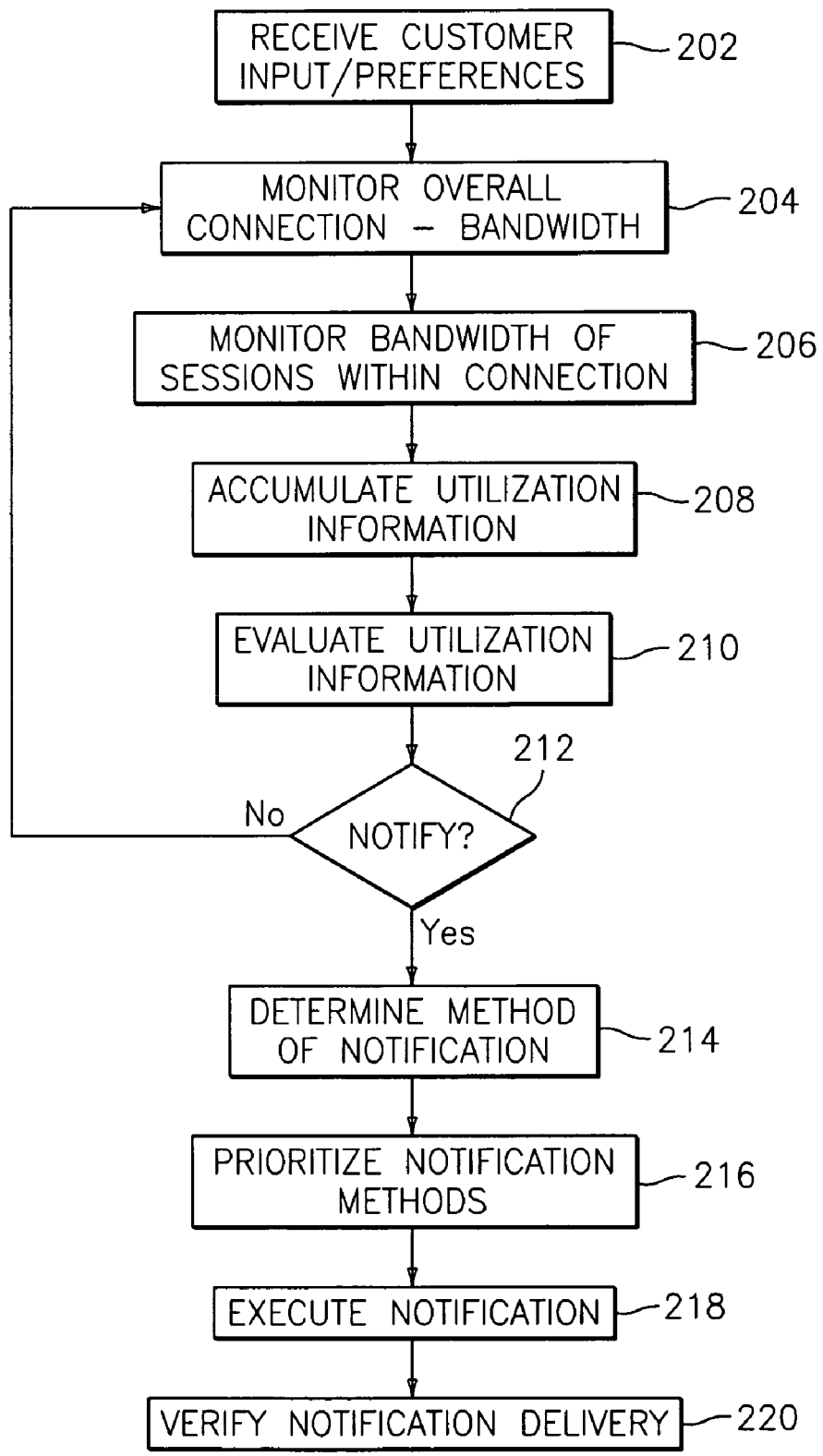
FIG. 2 is a flow diagram describing a process for implementing the bandwidth management services in exemplary embodiments.
Figure 3:
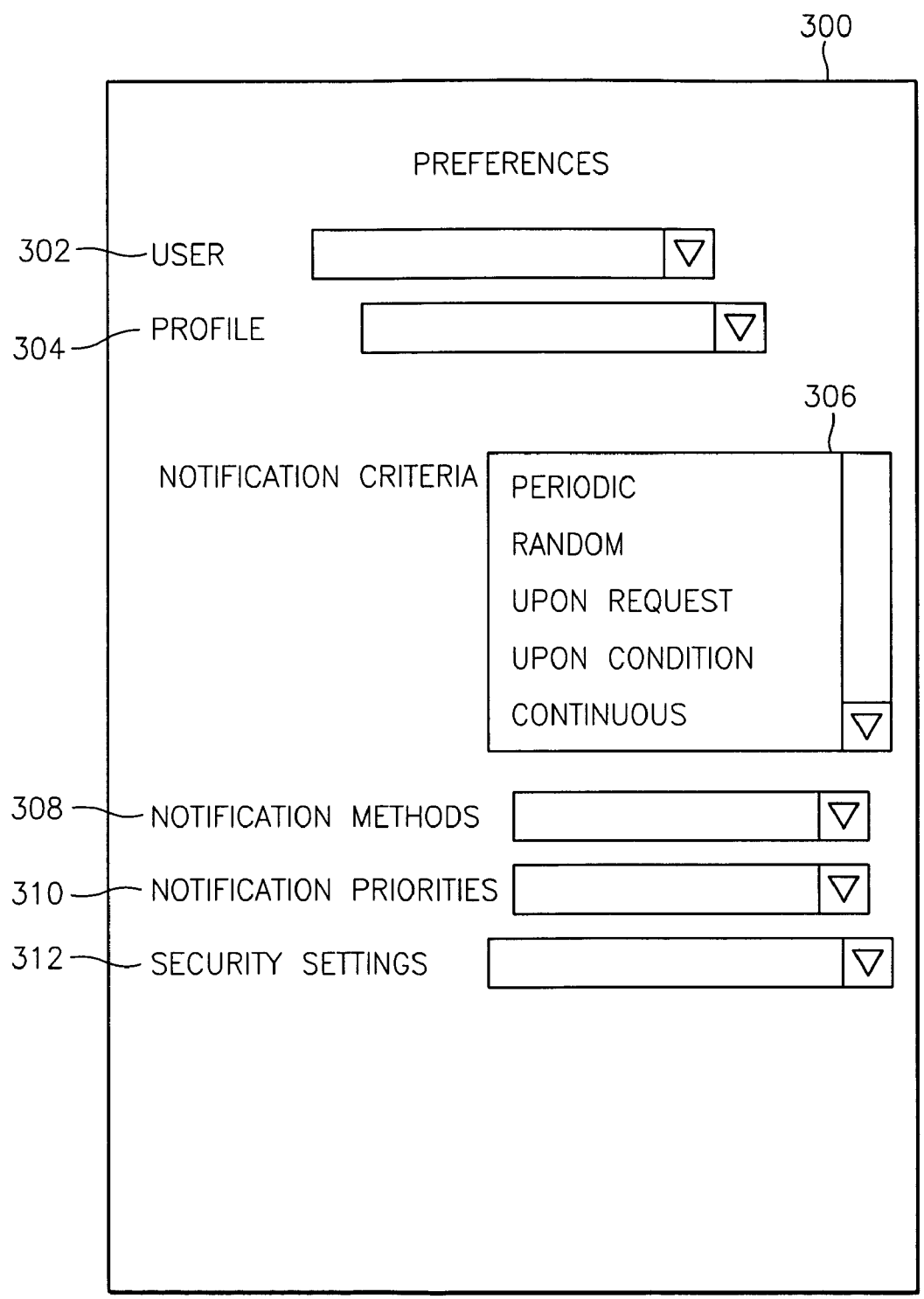
FIG. 3 is a user interface screen depicting options available for selection in facilitating implementation of the bandwidth management services in exemplary embodiments.

Turning now to FIG. 2, a flow diagram describing a process for implementing the bandwidth management services will be described in accordance with exemplary embodiments. At step 202, the host system 102 receives customer input relating to notification preferences via CSA 112. This information may be obtained directly via, e.g., a web site accessible via a broadband modem or residential gateway 121. Alternatively, this information may be obtained indirectly via, e.g., a user interface provided by the service provider that communicates to the monitoring/host system, or through a user interface provided by the residential gateway 121, in the case where the monitoring or notification functions are provided by the RG 121. A sample user interface 300 is shown in FIG. 3.

At step 204, the OBUM 124 monitors the overall connection bandwidth availability for customer premise 104. At step 206, the BSM 122 monitors the bandwidth and other useful aspects of active service sessions within the connection (e.g., two active PCs and communications associated with related applications, channels or data streams associated with one high definition TV, etc.). The BSM 122 identifies and tracks sessions and categorizes the data traffic to logically separate each session, thereby facilitating the measurements taken.

At step 208, the CSA 112 collects and accumulates bandwidth usage and other measurements and/or determinations received from steps 204 and 206. These accumulations may be over a variable (e.g., pre-configurable, adaptable) time window.

At step 210, the CSA 112 evaluates the collected and/or accumulated bandwidth information and other measured quantities and/or determinations. For example, the CSA 112 may determine usage percentages and relative usages for each session. Especially, the CSA 112 determines if/when/that "at risk user experience events" have occurred, including conditions where multiple sessions are likely to interfere with (e.g., predicted impact) or otherwise impact each other. The CSA 112 accomplishes this non-trivial determination or detection, e.g., using appropriate rules and algorithms to test various single measurements, and/or combinations of measurements, and/or calculated values based on such measurement inputs and/or determinations based on such measurement inputs against thresholds and/or other suitable criteria. Note that the determination of "likely to" events may involve some calculations or estimations of probabilities, which may be reflected in the setting of particular threshold values and/or may be accomplished via mathematical rules, algorithmic means, or heuristic techniques. Once processed, the CSA 112 sends the results to the CSNM 114.

At step 212, the CSNM 114 processes the information in order to determine when to send status notifications. The determination may be based upon a configurable "push" rule and exceeding thresholds. Alternatively or additionally, the determination may be based upon associated notification capabilities (e.g., device capabilities and selected preferences). If it is determined that no notifications are necessary, the process returns to step 204 where the monitoring continues. Otherwise, the CSNM 114 determines a method of notification at step 214. The method of notification may be based upon, e.g., user preferences, notification capabilities, or other suitable criteria.

At step 216, the CSNM 114 prioritizes the notification methods where more than one notification method is applicable. The prioritization process may consider both availability of notification target (e.g., one of devices 116-120) and the usefulness of the resulting notification to a non-technical user. The prioritization decisions may be based upon customer preferences (e.g., priority information associated with activities placed in tables or ordered lists), current situation or context, upcoming situation or context (e.g., within next fifteen minutes, next six hours, next week, etc.), pre-configured rules, particular capabilities of display devices or devices containing display or notification capabilities, etc.

At step 218, the CSNM 114 executes the notification in accordance with the methods and prioritization determinations in steps 214 and 216. Notifications may be in various visual forms, such as graph pipes, pie charts, histogram, etc., or may be a light or an icon displayed on a video-capable device. Alternatively or additionally, notifications may be audible and/or vibratory (e.g., bells, alarms, tones, chirps, sound sequences, synthesized/recorded speech, buzzing, etc.). Notifications may alternatively or additionally comprise messages (e.g., email, pager, updates to applications on a personal digital assistant, cell phone, or laptop), or may be shown within a web page that is accessed by a user. A sample status notification 400 is shown in FIG. 4.

At step 220, the CSNM 114 verifies that the notification has been delivered to and/or received by the proper device.

Turning now to FIG. 3, a sample user interface screen 300 for establishing notification preferences will now be described. As indicated above, a user may implement the notification preferences via a user interface provided by the bandwidth management application 110. The user interface screen 300 of FIG. 3 includes a USER field 302 that includes a drop down box for inputting or selecting a user. This option 302 may enables the bandwidth management application 110 to identify and associate specific device users with specific devices. For example, sample user settings provided via field 302 are shown below.

| | |
|---|---|
| USER1 | BDRM1TV |
| | BDRM1PC |
| | CELLPHONE1 |
| | FRTV (family room) |
| USER2 | BDRM2TV |
| | FRTV |
| USER3 | BDRM3TV |
| | CELLPHONE2 |
| | FRTV |

Likewise, each of the devices may have associated service capabilities, such as minimum bandwidth requirements. For some devices, such as a personal computer, there may be different minimum bandwidth requirements depending upon the application utilized for a given session (e.g., video conferencing, music or file downloading, etc.). The bandwidth management application 110 identifies the requirements for each device and related requirements for corresponding applications performed on the devices, including for example the bandwidth and/or other communications aspects required for various qualities of associated user experience. These requirements, and/or capabilities, are stored in the storage device 106 as described above in FIG. 1.

Alternatively, user settings may be simplified, with graphical depiction of the premises or devices, and simple (e.g., High-Medium-Low) settings for each device shown, where the user may simply click H-M-L as appropriate.

A user may identify or categorize users of customer premises 104 by profiles via the PROFILE field option 304.

Another option provided via the user interface screen 300 is a NOTIFICATION CRITERIA option 306 that includes a drop down box that enables a user to identify notification conditions and triggers. For example, the user may wish to be notified of bandwidth issues or conditions based upon, e.g., a periodic schedule, a random notification schedule, a request of the user, meeting a condition, etc. The notification may provide information such as a percentage of bandwidth currently utilized, a quality level provided/needed/consumed/used, etc., average peak values of any of the above, peak values of any of the above, history and/or average values of any of the above, and relative measures of items above (e.g., relative bandwidths of different applications or sessions, level consumed relative to the level needed, etc.). In addition, because the preferences include assigning users to devices within a customer premise, the bandwidth management application 110 enables a user to establish notifications based upon users, devices, groups of users (e.g., user profiles), or a combination thereof. Further, because users can request notifications upon request and/or based upon a schedule and/or based upon a triggering condition, the bandwidth management application 110 provides the ability for users to receive notifications that are situation dependent (e.g., on the day of the Super Bowl, notify user of device usage that exceeds a threshold so that uninterrupted, quality service may be facilitated for a selected device during the game).

A NOTIFICATION METHODS option 308 enables a user to identify the manner in which the user desires the notification to be implemented (e.g., email, pager, TV screen display, etc.). NOTIFICATION PRIORITIES field 310 enables the user to establish prioritization rules for notifications as described in FIG. 2 at step 216. A SECURITY SETTINGS option 312 enables a user to establish filtering rules for blocking overly intrusive or annoying notifications, excessive or repetitive notifications, notifications having a privacy impact, etc.

In exemplary embodiments, the bandwidth management application 110 may include a training model or learning algorithm for each customer premises such that customer preferences may be implied by the bandwidth management application 110 based upon customer history and patterns. The bandwidth management application 110 may record information regarding typical customer usage patterns, translate this information into a situational description (e.g., via rule selection and parameter settings), and periodically update this information.

As indicated above, the bandwidth management services monitor customer traffic in terms of bandwidth and/or other communications characteristics, analyze the traffic measurements, determine approximately when, and in what manner, simultaneously provided services (e.g., services provided over multiple simultaneous data sessions) are likely to interfere with or otherwise impact each other, and to appropriately notify those affected of these conditions or events either continuously and/or at the time, providing sufficient information and in an appropriately understandable manner so that those affected may take corrective actions.

As described above, the exemplary embodiments can be implemented in the form of computer-implemented processes and apparatuses for practicing those processes. The exemplary embodiments can also be implemented in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the embodiments. Exemplary embodiments can also be implemented in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for implementing bandwidth management services, comprising:
    receiving, from a user of a device, information uniquely identifying each of a plurality of other devices assigned to an account and information uniquely identifying users that are assigned to the plurality of other devices, the account defined by the plurality of other devices collectively receiving network services via a residential gateway residing within a location of the plurality of other devices;
    receiving notification preferences from the user of the device and storing the information and notification preferences in an account record for the account;
    receiving service session measurements for active service sessions of the plurality of other devices within the account;
    categorizing the service session measurements by each of the plurality of other devices participating in the active service sessions and users of the plurality of other devices participating in the active service sessions;
    evaluating the active service sessions for an event, the evaluating factoring in capabilities associated with each of the plurality of other devices and service session measurements categorized for each of the plurality of other devices participating in the active service sessions; wherein the event includes a situation that is determined to impact unfavorably on experiences of the users with the active service sessions; and
    notifying the user an occurrence of the event, comprising:
    generating and transmitting an alert to the user in accordance with the notification preferences, the transmitting the alert to the user including determining availability of the plurality of other devices to receive the alert and transmitting the alert to at least one user associated with at least one of the plurality of other devices affected by the event via the information stored in the account record based upon the determining availability.

2. The method of claim 1, wherein receiving, from the user of the device, information uniquely identifying each of the plurality of other devices assigned to the account and information uniquely identifying users that are assigned to the plurality of other devices includes assigning multiple users for at least one of the plurality of other devices for the account, and assigning multiple devices of the plurality of other devices to at least one of the users for the account;
    wherein each of the users for a respective device of the plurality of other devices in the account is uniquely identified by a user identifier; and
    wherein the notifying the user upon an occurrence of the event includes sending a notification to one of the plurality of other devices based upon an assigned user identifier and the notification preferences.

3. The method of claim 1, wherein the notification preferences include a manner of notification and a notification trigger.

4. The method of claim 3, wherein the evaluating includes comparing gathered service session measurements to at least one threshold; wherein the event occurs when the gathered service session measurements exceed the at least one threshold, the at least one threshold determined by the notification trigger.

5. The method of claim 3, wherein the generating and transmitting an alert includes determining an alert type and format based upon the capabilities.

6. The method of claim 3, wherein the evaluating includes comparing gathered service session measurements to at least one threshold; wherein the event occurs when the gathered service session measurements exceed the at least one threshold, the at least one threshold determined by characteristics and capabilities of the plurality of other devices and the active service sessions resulting in a minimum acceptable service level.

7. The method of claim 1, wherein each of the active service sessions is occurring simultaneously.

8. The method of claim 1, wherein the active service sessions are communications sessions utilizing bandwidth including at least one of:
    video content;
    audio content;
    generic data;
    gaming interactions;
    encrypted data;
    graphical content;
    pictorial content;
    interactive media content; and
    multi-media content; and
    wherein the plurality of other devices include at least one of:
       a television;
       a gaming system;
       a handheld device;
       a computer device; and
       a cell phone.

9. The method of claim 1, wherein the event comprises at least one of:
    a request for periodic notification;
    a request for random notification; and
    a condition including at least one of:
       an amount of bandwidth usage;
       a quality of service level;
       a threshold bandwidth value;
       a usage bandwidth value by user;
       a usage bandwidth value by device;
       a usage bandwidth value by sub-account, the account broken down into sub-accounts; and
       a usage bandwidth value by situation.

10. A system for implementing bandwidth management services, comprising:
    a processor;
    a bandwidth management application executing on the processor and receiving service session measurements from at least one monitoring device monitoring active service sessions, the bandwidth management application performing:
       receiving, from a user of a device, information uniquely identifying each of a plurality of other devices assigned to an account and information uniquely identifying users that are assigned to the plurality of other devices, the account defined by the plurality of other devices collectively receiving network services via a residential gateway residing within a location of the plurality of other devices;

receiving notification preferences from the user of the device and storing the information and notification preferences in an account record for the account;

receiving service session measurements for active service sessions of the plurality of other devices within the account;

categorizing the service session measurements by each of the plurality of other devices participating in the active service sessions and users of the plurality of other devices participating in the active service sessions;

evaluating the active service sessions for an event, the evaluating factoring in capabilities associated with each of the plurality of other devices and service session measurements categorized for each of the plurality of other devices participating in the active service sessions; wherein the event includes a situation that is determined to impact unfavorably on experiences of the users with the active service sessions; and notifying the user upon an occurrence of the event, comprising:

generating and transmitting an alert to the user in accordance with the notification preferences, the transmitting the alert to the user including determining availability of the plurality of other devices to receive the alert and transmitting the alert to at least one user associated with at least one of the plurality of other devices affected by the event via the information stored in the account record based upon the determining availability.

11. The system of claim 10, wherein receiving, from the user of the device, information uniquely identifying each of the plurality of other devices assigned to the account and information uniquely identifying users that are assigned to the plurality of other devices includes assigning multiple users for at least one of the plurality of other devices for the account, and assigning multiple devices of the plurality of other devices to at least one of the users for the account;

wherein each of the users for a respective device of the plurality of other devices in the account is uniquely identified by a user identifier; and wherein the notifying the user upon an occurrence of the event includes sending a notification to one of the plurality of other devices based upon an assigned user identifier and the notification preferences.

12. The system of claim 10, wherein the notification preferences include a manner of notification and a notification trigger.

13. The system of claim 12, wherein the evaluating includes comparing gathered service session measurements to at least one threshold; wherein the event occurs when the gathered service session measurements exceed the at least one threshold, the at least one threshold determined by the notification trigger.

14. The system of claim 12, wherein the generating and transmitting an alert includes determining an alert type and format based upon the capabilities.

15. The system of claim 12, wherein the evaluating includes comparing gathered service session measurements to at least one threshold; wherein the event occurs when the gathered service session measurements exceed the at least one threshold, the at least one threshold determined by characteristics and capabilities of the plurality of other devices and the active service sessions resulting in a minimum acceptable service level.

16. The system of claim 10, wherein each of the active service session occurs simultaneously.

17. The system of claim 10, wherein the active service sessions are communications sessions utilizing bandwidth including at least one of:
video content;
audio content;
generic data;
gaming interactions;
encrypted data;
graphical content;
pictorial content;
interactive media content; and
multi-media content; and
wherein the plurality of other devices include at least one of:
a television;
a gaming system;
a handheld device;
a computer device; and
a cell phone.

18. The system of claim 10, wherein the event comprises at least one of:
a request for periodic notification;
a request for random notification; and
a condition including at least one of:
an amount of bandwidth usage;
a quality of service level;
a threshold bandwidth value;
a usage bandwidth value by user;
a usage bandwidth value by device;
a usage bandwidth value by sub-account, the account broken down into sub-accounts; and
a usage bandwidth value by situation.

19. A computer program product for implementing bandwidth management services, the computer program product comprising a non-transitory computer-readable storage medium having instructions embodied thereon, which when executed by a computer cause the computer to implement a method, the method comprising the steps of:

receiving, from a user of a device, information uniquely identifying each of a plurality of other devices assigned to an account and information uniquely identifying users that are assigned to the plurality of other devices, the account defined by the plurality of other devices collectively receiving network services via a residential gateway residing within a location the plurality of other devices;

receiving notification preferences from the user of the device and storing the information and notification preferences in an account record for the account;

receiving service session measurements for active service sessions of the plurality of other devices within the account;

categorizing the service session measurements by each of the plurality of other devices participating in the active service sessions and users of the plurality of other devices participating in the active service sessions;

evaluating the active service sessions for an event, the evaluating factoring in capabilities associated with each of the plurality of other devices and service session measurements categorized for each of the plurality of other devices participating in the active service sessions, wherein the event includes a situation that is determined to impact unfavorably on experiences of the users with the active service sessions; and notifying the user upon an occurrence of the event, comprising:
generating and transmitting an alert to the user in accordance with the notification preferences, the transmitting the alert to the user including determining availability of the plurality of other devices to receive the alert and transmitting the alert to at least one user associated with at least one of the plurality of other devices affected by the event via the information stored in the account record based upon the determining availability.

20. The computer program product of claim 19, wherein receiving, from the user of the device, information uniquely identifying each of the plurality of other devices assigned to the account and information uniquely identifying users that are assigned to the plurality of other devices includes assigning multiple users for at least one of the plurality of other devices for the account, and assigning multiple devices of the plurality of other devices to at least one of the users for the account;
wherein each of the users for a respective device of the plurality of other devices in the account is uniquely identified by a user identifier; and
wherein the notifying the user upon an occurrence of the event includes sending a notification to one of the plurality of other devices based upon an assigned user identifier and the notification preferences.

21. The computer program product of claim 19, wherein the notification preferences include a manner of notification and a notification trigger.

22. The computer program product of claim 21, wherein the evaluating includes comparing gathered service session measurements to at least one threshold; wherein the event occurs when the gathered service session measurements exceed the at least one threshold, the at least one threshold determined by the notification trigger.

23. The computer program product of claim 21, wherein the generating and transmitting an alert includes determining an alert type and format based upon the capabilities.

24. The computer program product of claim 21, wherein the evaluating includes comparing gathered service session measurements to at least one threshold; wherein the event occurs when the gathered service session measurements exceed the at least one threshold, the at least one threshold determined by characteristics and capabilities of the plurality of other devices and the active service sessions resulting in a minimum acceptable service level.

25. The computer program product of claim 19, wherein each of the active service sessions occurs simultaneously.

26. The computer program product of claim 19, wherein the active service sessions are communications sessions utilizing bandwidth including at least one of:
video content;
audio content;
generic data;
gaming interactions;
encrypted data;
graphical content;
pictorial content;
interactive media content; and
multi-media content; and
wherein the plurality of other devices include at least one of:
a television;
a gaming system;
a handheld device;
a computer device; and
a cell phone.

27. The computer program product of claim 19, wherein the event comprises at least one of:
a request for periodic notification;
a request for random notification; and
a condition including at least one of:
an amount of bandwidth usage;
a quality of service level;
a threshold bandwidth value;
a usage bandwidth value by user;
a usage bandwidth value by device;
a usage bandwidth value by sub-account, the account broken down into sub-accounts; and
a usage bandwidth value by situation.

* * * * *